United States Patent
Okamoto et al.

[11] Patent Number: 6,089,755
[45] Date of Patent: Jul. 18, 2000

[54] SLIDING BEARING

[75] Inventors: Yutaka Okamoto; Takayuki Shibayama, both of Nagoya, Japan

[73] Assignee: Daido Metal Company Ltd., Nagoya, Japan

[21] Appl. No.: 09/195,192

[22] Filed: Nov. 18, 1998

[30] Foreign Application Priority Data

Feb. 6, 1998 [JP] Japan ................................ 10-025636

[51] Int. Cl.$^7$ .................................................. F16C 33/06
[52] U.S. Cl. .............................................. 384/276; 384/294
[58] Field of Search .................................... 384/276, 294, 384/278, 286, 288

[56] References Cited

FOREIGN PATENT DOCUMENTS 7-167149  7/1995  Japan .

*Primary Examiner*—Lenard A. Footland
*Attorney, Agent, or Firm*—Browdy and Neimark P.L.L.C.

[57] ABSTRACT

A sliding bearing comprises a back metal and a bearing alloy layer formed thereon, the thickness of the back metal gradually decreasing from the middle portion toward each axial end portion, and the thickness of the bearing alloy layer being increased at each axial end portion. The bearing alloy layer has a Young's modulus smaller than that of the back metal of steel plate and hence it is elastically deformed with greater ease, and therefore, particularly at the beginning of the use, the oil film pressure at each axial end portion becomes higher when misalignment takes place, with the result that the bearing alloy layer is elastically deformed in the direction of compression. In consequence, the oil film thickness at opposite end portions is increased to prevent rupture of oil film, thus avoiding occurrence of metal contact.

3 Claims, 3 Drawing Sheets

SLIDING BEARING

BACKGROUND OF THE INVENTION

The present invention relates to a sliding bearing comprising a back metal and a bearing alloy layer bonded thereto, and more particularly to a sliding bearing with improved conformability.

In gasoline and Diesel engines, for instance, as a main bearing for supporting a crankshaft thereof, two half sliding bearings are combined together and used, each half sliding bearing comprising a steel back metal and a bearing alloy layer of Cu- or Al-based alloy formed on the back metal and, if necessary, an overlay formed on the surface of the bearing alloy layer. Incidentally, in the above-described bearings for engines, it is general that an overall thickness is about 1.5 mm, a thickness of the back metal is about 1.2 mm, a thickness of the bearing alloy layer is about 0.3 mm, and a thickness of the overlay formed as the occasion demands is about 20 μm.

FIG. 5 is an axial sectional view of a main sliding bearing showing axial distributions of oil film pressure. In a steady state achieved after the main sliding bearing and a crankshaft had come to have conformability, the pressure on the oil film occurring between a bearing alloy layer (or an overlay) and the crankshaft is high at the axially middle portion and becomes lower gradually toward each axial end, as shown by a solid line in FIG. 5. However, in an initial state before they have come to have satisfactory conformability, the pressure on the oil film is higher at each axial end portion than at the middle portion, as shown by a broken line in FIG. 5.

One of reasons for high oil film pressure at each axial end portion is the misalignment between the crankshaft and such each axial end portion in the initial state. In other words, If misalignment or the like takes place, the thickness of the oil film becomes smaller and accordingly the pressure on the oil film becomes higher at such each axial end portion. In this way, at each axial end portion, the oil film thickness becomes thin and the oil film pressure becomes high. Such thin oil film is liable to be ruptured due to fluctuations in load and rotational speed and so on. If the oil film is ruptured, there will be caused what is called metallic contact that the crankshaft and the bearing alloy layer (or overlay) are brought into direct contact with each other, resulting in wear of the bearing alloy layer. After the opposite end portions of the bearing alloy layer have been worn out at an early state in the manner described above, loads must be borne by portions subtracting the opposite end portions, with the result that a pressure receiving area is reduced to shorten the service life of the bearing.

OBJECT AND SUMMARY OF THE INVENTION

In view of the above circumstances, the present invention was made and an object thereof is to provide a sliding bearing in which the oil film pressure at each axial end portion can be reduced in an initial state, so that it is possible to remarkably prevent occurrence of not only rupture of oil film but also metallic contact.

In order to achieve this end, there is provided according to the present invention a sliding bearing comprising a back metal and a bearing alloy layer bonded onto the back metal, the back metal being provided at each axial end portion of the sliding bearing with a thickness thinner than that of an axially middle portion of the back metal, the bearing alloy layer being provided at each axially end portion of the sliding bearing with a thickness thicker than that of the axially middle portion of the bearing alloy layer.

Generally, in sliding bearings, since the back metal is made of steel material, the bearing alloy layer made of Cu-, Al-based or other alloy has a Young's modulus smaller than that of the back metal and hence it is elastically deformed with a greater degree. In the sliding bearing constructed as described above, the thickness of the bearing alloy layer is increased at each axial end portion, and therefore the opposite axial end portions of the bearing alloy layer are made to easily undergo elastic deformation. In consequence, when the oil film pressure at each axial end portion becomes higher at the beginning of the use of the sliding bearing, the opposite axial end portions of the bearing alloy layer are elastically deformed so as to reduce the thickness of the bearing alloy layer under the influence of the high oil film pressure, thereby making it easy to compensate the misalignment between shaft and bearing. And, if the bearing alloy layer is elastically deformed as described above, the oil film thickness at each axial end portion becomes thicker in proportion to the degree of elastic deformation of the bearing alloy layer, so that the oil film will not easily be ruptured due to fluctuation in load. As a result, it becomes possible to effectively prevent occurrence of metallic contact, resulting in a long service life of the bearing.

Further, according to the invention, the thickness of the back metal at each axial end portion thereof is made thinner stepwise, and therefore the bearing alloy layer can be thickened stepwise at each axial end portion thereof.

With the construction described above, a cutting process with a milling cutter or the like is available for reducing the thickness of the back metal at its opposite axial end portions, with the result that the thickness of the back metal at its opposite end portions can be reduced without difficulty.

DESCRIPTION OF THE PREFERRED EMBODIMENTS

Figure 1:
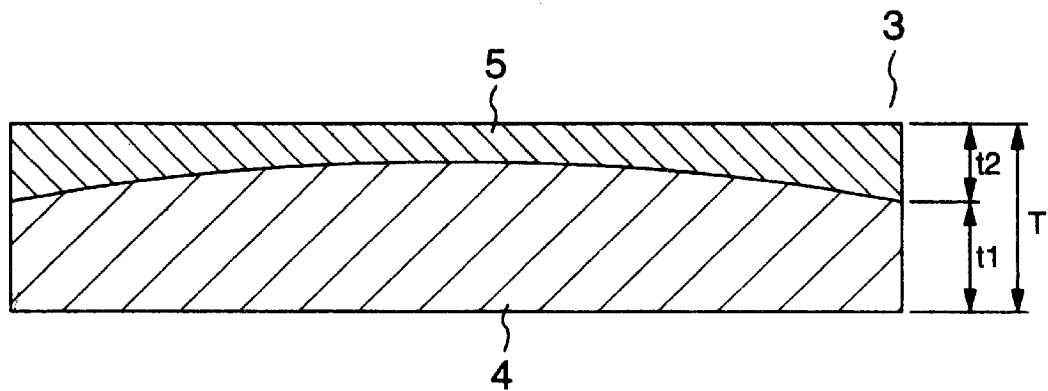
FIG. 1 is an axial sectional view of a sliding bearing according to an embodiment of the present invention.

Now, referring to FIGS. 1 to 3, description will be given of a sliding bearing according to an embodiment of the present invention which is used as a main bearing for supporting a crankshaft of an engine.

Figure 2:
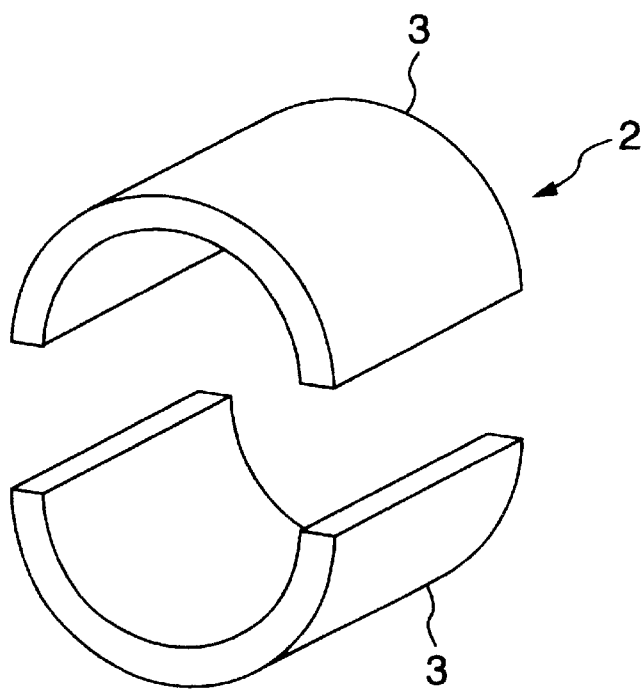
FIG. 2 is an exploded perspective view of a main bearing.
Figure 3:
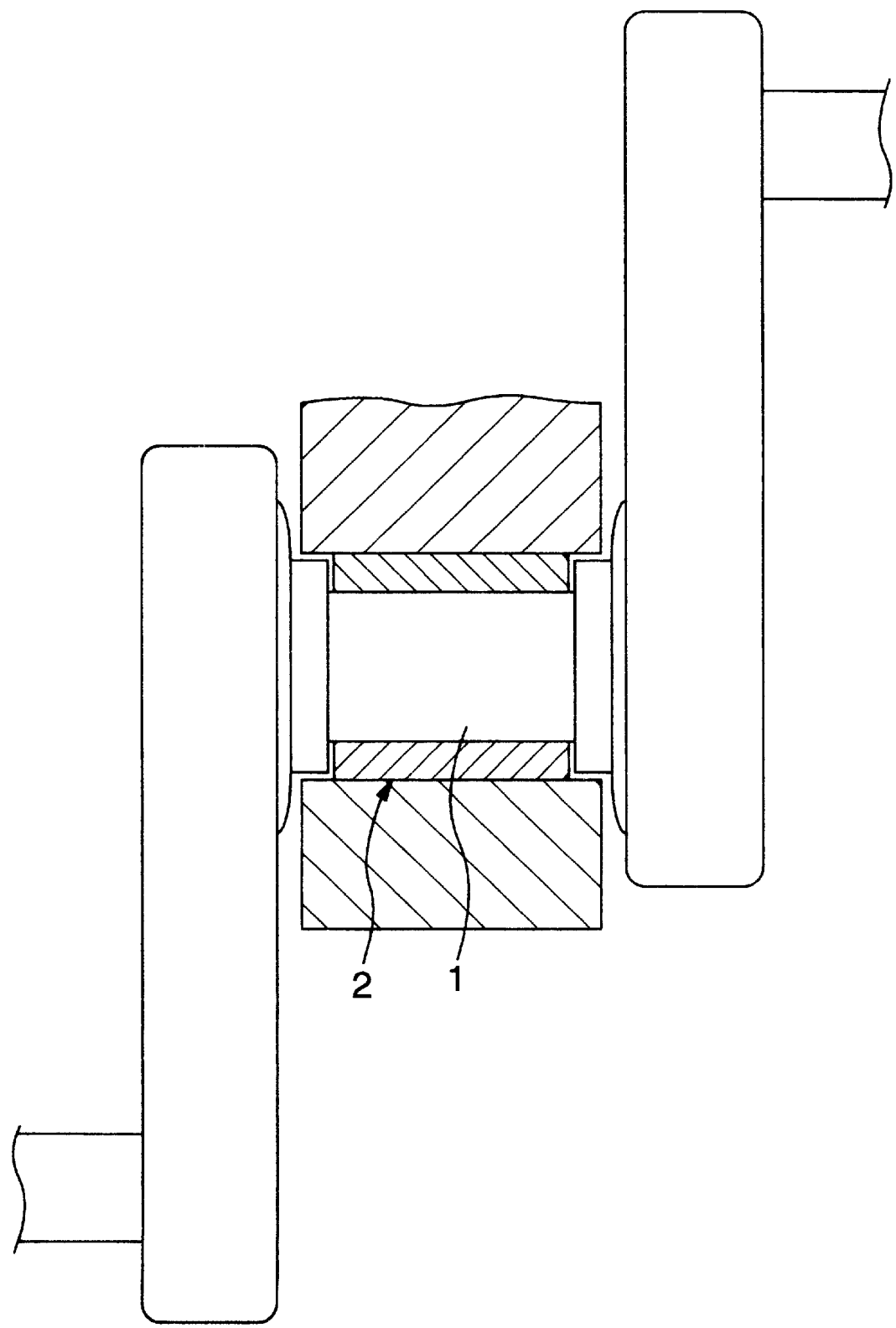
FIG. 3 is a sectional view of a main bearing portion for a crankshaft of an engine.

A main bearing 2 shown in FIG. 3 as a sliding bearing for supporting a crankshaft 1 is formed by combining two semicylindrical half bearings 3 together as shown in FIG. 2. The half bearing 3 comprises a back metal 4 of steel plate and a bearing alloy layer 5 of Cu- or Al-based alloy bonded thereonto.

The half bearing 3 has a constant, overall thickness T at various portions thereof, the overall thickness T being the sum of a thickness of the back metal 4 and that of the bearing alloy layer 5. The thicknesses of the back metal 4 and the bearing alloy layer 5 each differ from portion to portion in the axial direction. Namely, as shown in FIG. 1, the back metal 4 is formed convexly so that an inner peripheral surface thereof is bulged in the form of an arc from each axial end to the center. Therefore, the thickness of the back metal 4 gradually decreases from the center toward the opposite ends in the axial direction. And, an inner peripheral surface of the bearing alloy layer 5 bonded onto the inner peripheral surface of the back metal 4 is formed in the shape of a cylinder whose axis coincides with that of an outer peripheral surface of the back metal 4. Accordingly, the thickness of the bearing alloy layer 5 gradually increases from the center toward the opposite ends in the axial direction. the thickness t1 of the back metal 4 is about 0.9 mm at the thinnest opposite axial end portions and about 1.2 mm at the thickest middle portion, and the thickness t2 of the bearing alloy layer 5 is about 0.6 mm at the thickest opposite axial end portions and about 0.3 mm at the thinnest middle portion.

An example of method for manufacturing this type of half bearing 3 is summarized below. First of all, a strip of back metal blank is punched out from a steel plate. This back metal blank is subjected to cutting or roller rolling so that one of surfaces thereof is formed to have a convex shape. Then, a bearing alloy layer is bonded onto this convex-shaped surface of the back metal blank by sintering, casting or pressure-bonding of bearing alloy sheet. Thereafter, the back metal blank having the bearing alloy layer bonded thereonto is formed into semicylindrical shape and the inner peripheral surface of the bearing alloy layer is subjected to finishing.

Meanwhile, the bearing alloy layer 5 of Cu- or Al-based alloy has a Young's modulus smaller than that of the back metal 4 of steel plate, so that it is subjected to elastic deformation with greater ease than the back metal 4. In the half bearing 3 of this embodiment, the thickness of the bearing alloy layer 5 is increased at each axial end portion of the bearing, and therefore the bearing alloy layer 5 is allowed to easily undergo elastic deformation at the opposite axial end portions thereof.

In cases where a main bearing is formed by combining two half bearings 3 of this type and assembled into an engine to support the crankshaft 1, when the crankshaft 1 is rotated, an oil film is formed between the crankshaft 1 and the bearing alloy layer 5, thus providing a hydrodynamic lubrication state in which the crankshaft 1 is supported by this oil film.

At the beginning of the use of the engine during which the accumulated operating time of the engine is short, the pressure of the aforementioned oil film supporting the crankshaft 1 tends to become higher at each axial end portion than at the middle portion of the bearing. In this embodiment, the thickness of the bearing alloy layer 5 is increased at the opposite axial end portions, so that, when the oil film pressure at each axial end portion becomes higher, the bearing alloy layer 5 is subjected to elastic deformation in such a manner that the opposite axial end portions of the bearing alloy layer are reduced in thickness (compressed) under the influence of the high oil film pressure. Due to this elastic deformation, the oil film thickness at each axial end portion of the bearing alloy layer 5 is increased, and therefore the oil film does not break even in a case where the load fluctuates. For this reason, there is caused no metallic contact that the crankshaft 1 is brought into direct contact with the bearing alloy layer 5, thereby making it possible to effectively prevent early wear of the bearing alloy layer 5, seizure trouble and so on from taking place.

Further, metallic contact at each axial end portion can be avoided from the beginning of the use as described above, and therefore it is possible to prevent the opposite axial end portions of the bearing alloy layer 5 from being worn out, with the result that reduction of the pressure receiving area of the bearing alloy layer 5 can be prevented and hence the load can be borne by almost all the area between the opposite axial ends over a long period.

By the way, JP-A-7-167149 discloses a technology for preventing partial wear of bearing alloy layer at each axial end portion thereof, in which a back metal is formed therein so that slit portions may extend from its opposite end faces toward the center in the axial direction so as to enhance elastic deformability of the back metal at its opposite axial end portions, with the intention of causing end portions of a bearing to be deformed by oil film pressure to avoid misalignment when a crankshaft happens to tilt or anything.

In this conventional technology, however, the slit portions are formed in those positions in the back metal located in the middle of the thickness of the back metal. For this reason, the portion provided with the slit portion is in a cantilevered state and hence subjected to local deformation, and therefore the bearing alloy layer is liable to be fatigued due to that local deformation, resulting in occurrence of crack. Further, the process of forming the slit portions partially in the back metal of steel plate in such a manner that they are located in the middle of the thickness of the back metal, is difficult and unfavorable from the viewpoint of cost. On the other hand, in the present embodiment of the invention, the bearing alloy layer 5 is elastically deformed in the direction of thickness (or in the direction of compression) so as to prevent misalignment, so that it is hard to be fatigued, and further the process of forming the back metal in convex shape can be easily performed by cutting, roller shaping or the like, and therefore it is possible to reduce the production cost.

Figure 4:
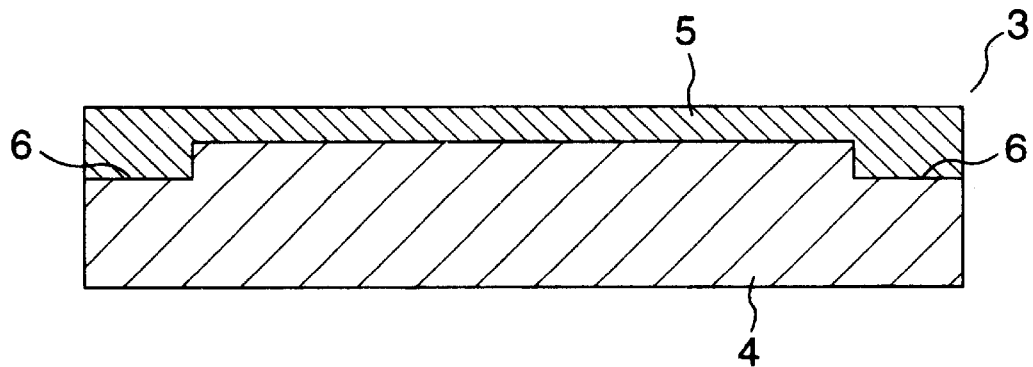
FIG. 4 is an axial sectional view similar to FIG. 1 but showing another embodiment of the invention.
Figure 5:
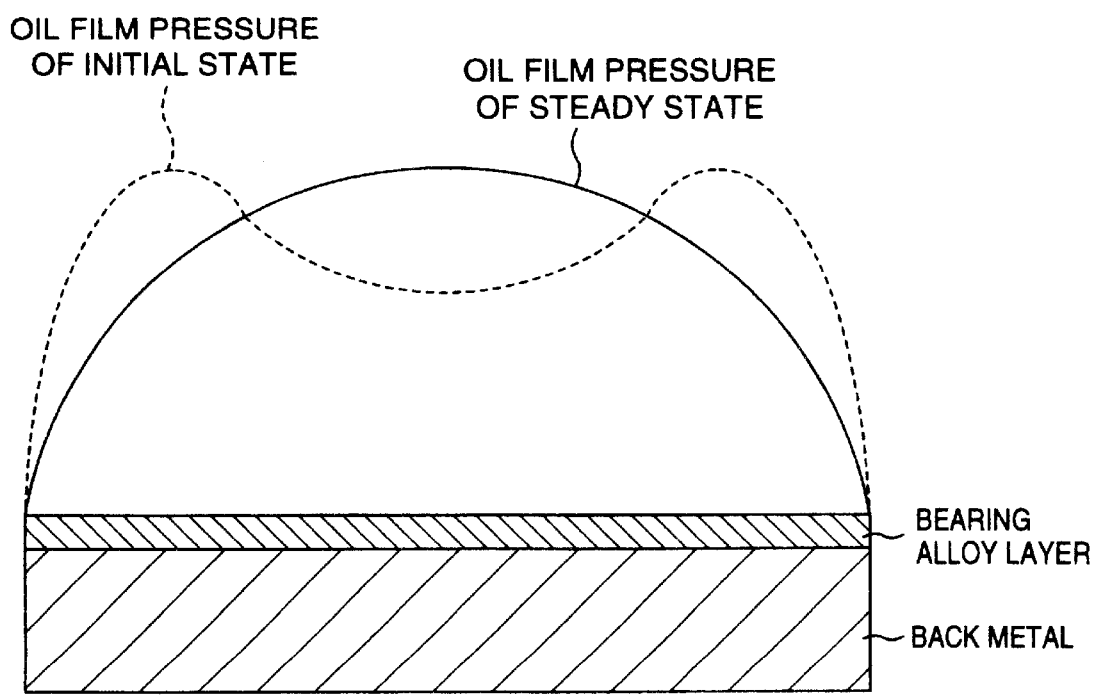
FIG. 5 is an axial distribution chart of oil film pressure for explanation of problems of a conventional sliding bearing.

FIG. 4 shows another embodiment of the present invention, in which the same parts as those of the above-described embodiment are denoted by the same reference numerals, respectively, and the detailed description thereof is omitted. Description will be given of different parts alone.

In a half bearing 3 of this embodiment, a back metal 4 has stepped notches 6 formed at opposite axial end portions in an inner surface thereof, so that the thickness of the back metal 4 at each axial end portion is made thinner stepwise. And, a bearing alloy layer 5 bonded onto the back metal 4 is thickened stepwise at each axial end portion thereof corresponding to the notch 6.

As described above, since the back metal 4 is made thinner stepwise at its opposite axial end portions, working for forming such thinner portions is performed by partially working the back metal, and moreover this process can be easily performed by, for example, cutting with a milling cutter, and therefore it is possible to reduce the manufacturing cost all the more.

Incidentally, the present invention is not limited to the abovementioned and illustrated embodiments but may be extended and changed as follows.

The bearing alloy layer 5 may be coated with an overlay as the occasion demands, the overlay being able to be made of a variety of metals including Pb- and Sn-base ones.

The present invention is applicable not only to the sliding bearing formed by combining two half bearings but also to sliding bearings formed in a cylindrical shape from the beginning.

Further, the present invention is applicable not only to the bearings for supporting crankshaft but also to the bearings for receiving crankpin and piston pin, and furthermore it is widely available to the sliding bearings without being limited to the bearings for engines.

What is claimed is:

1. A sliding bearing comprising a back metal and a bearing alloy layer bonded onto the back metal, said back metal being provided at each axial end portion of the sliding bearing with a thickness thinner than that of an axially middle portion of said back metal, said bearing alloy layer being provided at each axially end portion of the sliding bearing with a thickness thicker than that of the axially middle portion of said bearing alloy layer.

2. A sliding bearing according to claim 1, wherein said sliding bearing has such an axial cross-section as a boundary defined by both of the back metal and the bearing alloy layer is arched.

3. A sliding bearing according to claim 1, wherein said sliding bearing has such an axial cross-section as a boundary defined by both of the back metal and the bearing alloy layer is stepwise.

* * * * *